United States Patent Office.

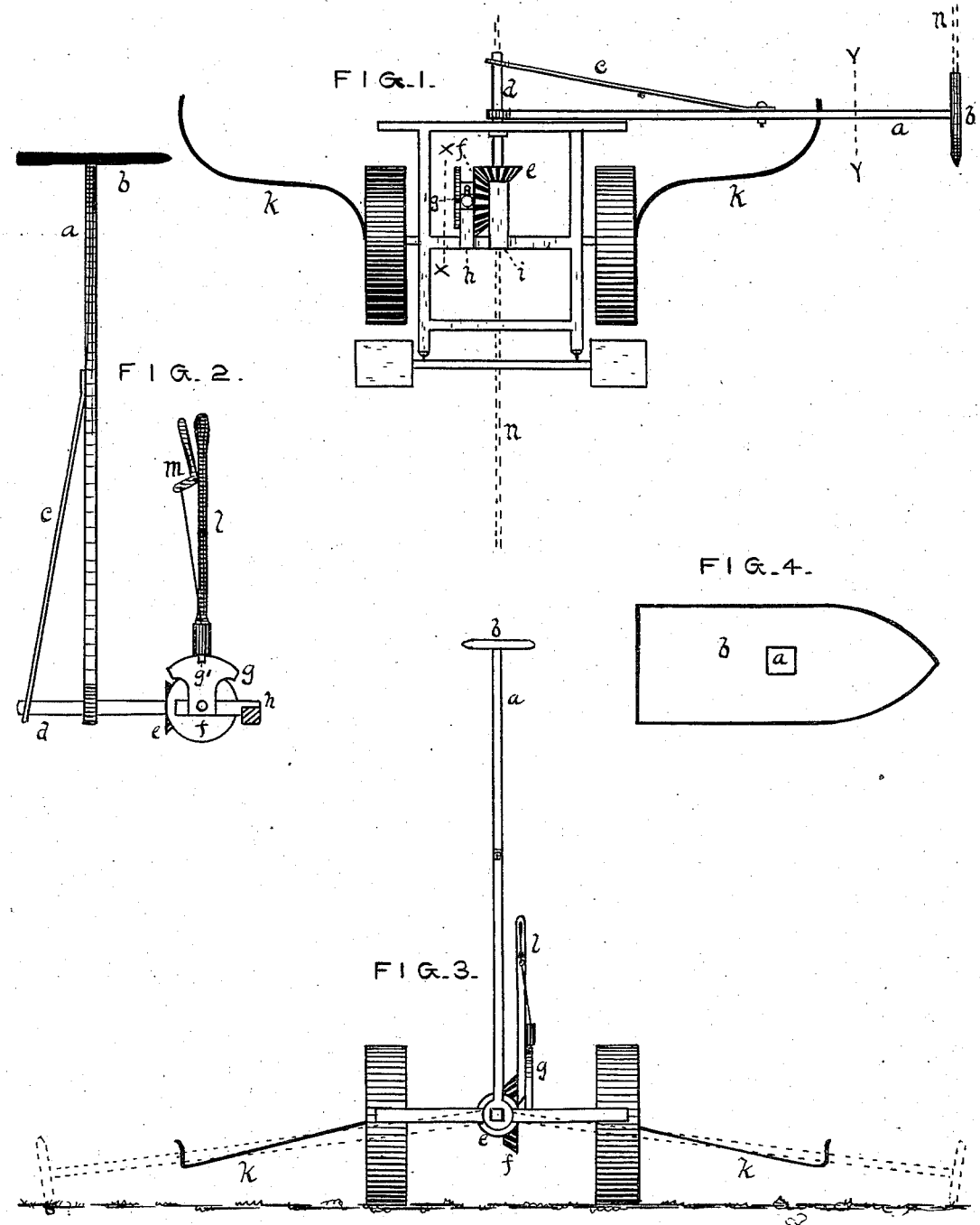

CHARLES Q. TAYLOR AND BENJAMIN F. GRAY, OF ARGENTA, ILLINOIS.

MARKER FOR CORN-PLANTERS.

SPECIFICATION forming part of Letters Patent No. 305,641, dated September 23, 1884.

Application filed June 9, 1884. (No model.)

*To all whom it may concern:*

Be it known that we, CHARLES Q. TAYLOR and BENJAMIN F. GRAY, citizens of the United States, residing near Argenta, in the county of Macon and State of Illinois, have invented certain new and useful Improvements in Markers for Corn-Planters, of which the following is a specification.

The object of our invention is to produce a marker for corn-planters that can be thrown from one side of the planter to the other, or be held in a vertical position by the driver while in his customary position on the seat of the planter.

In the drawings accompanying and forming a part of this specification, Figure 1 is a plan of the wheels and frame of a corn-planter, showing our device attached thereto. Fig. 2 is a side view of our device from dotted line $x\ x$ in Fig. 1, showing the marker-shaft in a vertical position. Fig. 3 is a rear view of the planter. Fig. 4 shows a preferred form of marker shoe or runner, and Fig. 5 indicates the termination of the marker-brace as seen in side elevation from dotted line $y\ y$ in Fig. 1.

$a$ is the marker-shaft, provided with shoe or runner $b$. $c$ is a brace used to strengthen shaft $a$ and make its position with relation to shaft $d$ more permanent. $d$ is a shaft provided with bearings in the planter-frame and in block $i$. $e$ is a pinion rigidly attached to shaft $d$. $f$ is a gear-wheel adapted to mesh with pinion $e$, and provided with bearings in blocks $h\ i$. $l$ is a lever rigidly attached to wheel $f$. $g$ is a rack provided with a single indentation, $g'$. $h$ and $i$ are blocks secured to the planter-frame for the purpose of providing bearings for wheels $e\ f$ and rack $g$. $k\ k$ represent spring-braces extending outward and rearward from the caps of the wheels, to which they are rigidly attached.

In operation the runner $b$ makes the impression $n$ as the planter moves across the field, and this impression serves as a guide for the driver on his return. On approaching the end of the field, lever $l$ is operated by the driver and the marker-shaft elevated to a vertical position, as indicated in Fig. 3. The lever $l$ is provided with a spring-pawl, that engages the indentation $g'$ and holds the marker-shaft in a vertical position. After a turn is made at the end of the field, pressure is applied to short lever $m$, which causes the pawl to become disengaged from the rack $g$, after which the marker is permitted to fall on the side of the planter opposite to which it was taken up, and the planting is continued in the customary manner. Spring-braces $k\ k$ have sufficient elasticity to prevent their coming in contact with the ground while the planter is moved backward, and, as shown in Fig. 5, their termination is such that the shaft $a$ readily falls in proper position with relation thereto.

It is evident that the shape of the marker may be varied without affecting the principle of our invention, and it is also evident the manner of attaching our device to various planters must be modified to conform to the construction of the same.

We claim as new and desire to secure by Letters Patent—

1. The combination, in a marker for corn-planters, of lever $l$, wheel $f$, pinion $e$, shafts $d$ and $a$, and shoe or runner $b$, as and for the purpose set forth.

2. The combination, in a marker for corn-planters, of lever $l$, wheel $f$, pinion $e$, rack $g$, provided with indentation $g'$, shafts $d$ and $a$, and shoe or runner $b$, as and for the purpose set forth.

3. The combination, with marker-shaft $a$ and with the wheels of a corn-planter, of elastic braces $k\ k$, as and for the purpose set forth.

CHARLES Q. TAYLOR.
BENJAMIN F. GRAY.

Witnesses:
 GEORGE MILLER,
 SAUL HILBRANT,
 SAMUEL DINGER.